Sept. 17, 1935.                H. N. WAYNE                2,014,600
                              FLOAT VALVE
                          Filed Feb. 26, 1934

Inventor
Herbert N. Wayne.
By R. S. Berry,
Attorney

Patented Sept. 17, 1935

2,014,600

UNITED STATES PATENT OFFICE 2,014,600

FLOAT VALVE

Herbert N. Wayne, Santa Monica, Calif.

Application February 26, 1934, Serial No. 712,910

2 Claims. (Cl. 4—56)

This invention relates to a float valve for flush tanks of toilets and the like.

An object of the invention is to provide an appliance for float valves of the above character whereby the seating portion of the valve may be readily renewed when excessively worn or distorted, so as to obviate necessity of renewing the float valve as a whole; the invention residing in the provision of an elastic or resilient jacket which is adapted to be applied over a float valve to afford a cover which will compensate for wear of the float valve body and also afford a cover which is removable and replaceable and thus be renewable as occasion may require.

Another object is to provide a float valve appliance of the above character which is so formed that when applied a water cushion will be afforded between the jacket and the valve body to which it is attached so as to insure its proper contact with the valve seat independent of the valve body on which the jacket is mounted.

A further object is to provide a construction of the above character which is especially applicable for use in conjunction with float valves of types now generally in use and which also lends itself to being applied in association with a valve body specially designed for use in connection with the renewable jacket.

With the foregoing objects and purposes in view together with such other objects and advantages as may subsequently appear, the invention further resides in the parts and in the combination, construction and arrangement of parts hereinafter described and claimed, and illustrated by way of example in the accompanying drawing in which:

Figure 1:
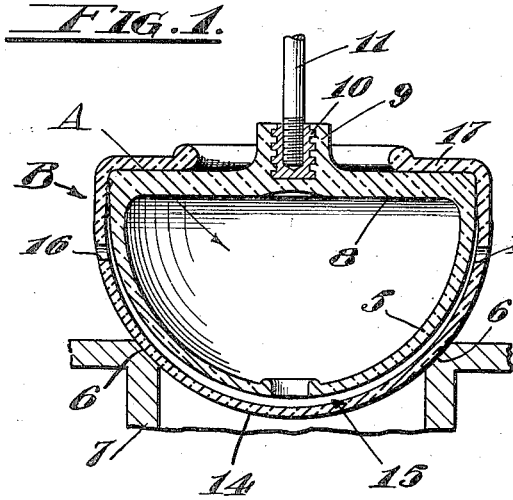
Fig. 1 is a view in vertical section with the parts in elevation, showing the invention as applied to a conventional type of float valve and showing the valve as associated with a valve seat.

Referring to the drawing more specifically, A indicates generally a float valve of conventional construction which comprises a hollow substantially hemispherical body, the walls of which are formed of rubber or rubber composition and are thereby rendered elastic and resilient throughout. The hemispherical wall portion 5 of the valve constitutes the lower portion thereof and is designed to seat upon the margin 6 of a flush pipe 7 which margin constitutes the valve seat. The upper portion of the valve consists of a circular wall 8 formed with an upstanding central lug 9 in which is imbedded an interiorly threaded socket 10 adapted to be screwed onto the usual valve stem 11. The hollow valve thus formed is buoyant and is normally maintained on its seat by the weight of water in the flush tank imposed thereon.

In carrying out the invention, I provide an elastic jacket B which is designed to be applied to the valve A to cover the lower portion thereof, which jacket includes a substantially hemispherical wall portion 14, the upper margin of which is in the form of a ring having an internal diameter substantially corresponding to the diameter of the upper margin of the valve A. However, the interior diameter of the upper or ring portion of the jacket is preferably of slightly less diameter than that of the margin of the valve A, whereby on applying the jacket the upper portion thereof will be slightly distended to engage the upper margin of the valve A to grip the latter under tension. The interior surface of the hemispherical portion 14 of the jacket is formed on a radius substantially corresponding to that of the external surface of the wall 5 of the valve, but the wall 14 is formed so as to extend eccentric to the wall 5 when the jacket is applied and thereby provide a space 15 between the jacket wall 14 and the wall 5 of the valve.

A series of apertures 16 is formed in the wall 14 leading from the exterior thereof to the space 15; the apertures being located adjacent the upper margin of the wall 14 so as to be above the valve seat 6 and whereby water in the flush tank may pass to the space 15 and thereby form a water cushion throughout the interior of the wall 14 under pressure according to the pressure afforded by the water in the flush tank, and whereby the jacket 14 will be maintained in close contact with the valve seat irrespective of wear or distortion of the wall 5 of the float valve.

An inwardly projecting flange 17 is formed on the upper margin of the wall 14 to overlie the top wall 8 of the valve A, which flange serves in cooperation with the marginal upper portion of the wall 14 to retain the jacket in place on the valve A.

Figure 3:
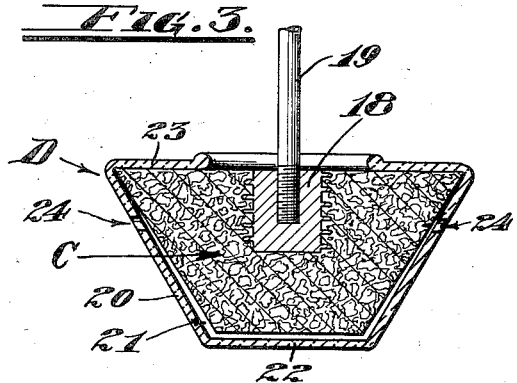
Fig. 3 is a view in section and elevation illustrating the invention as applied and adapted to a specially constructed valve body.
Figure 4:
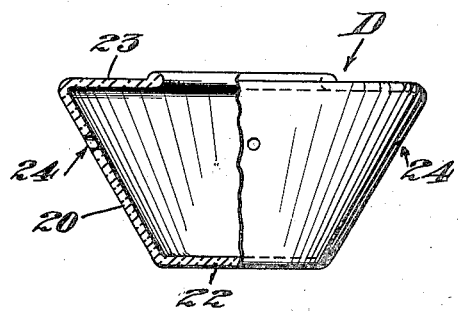
Fig. 4 is a view in side elevation partially in vertical section of the valve jacket shown in Fig. 3.

In the form of the invention shown in Figs. 3 and 4 a valve body C is provided which is here shown as frusto-conical in form, that is in the shape of an inverted truncated cone, thus providing a body structure of downwardly converging walls. This structure C may be of any suitable material to render it buoyant and constitute a float. Examples of such materials are sponge rubber, cork, balsa wood, and the like. The body C is formed with an internally threaded socket 18 for engagement with the valve stem 19.

In carrying out the invention in this instance a flexible jacket D is provided having a convergent side wall 20 extending on an angle to the horizontal slightly greater than the angle of inclination of the side wall of the float member C so as to provide a space 21 between said walls.

Figure 2:
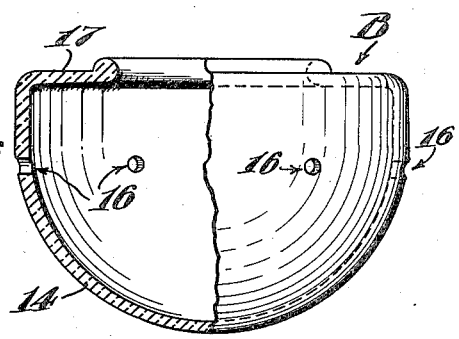
Fig. 2 is a view in side elevation partially in vertical section of the valve jacket shown in Fig. 1.

The side wall 20 of the jacket is connected at its lower end to a bottom wall 22 which is spaced from the bottom wall of the float member C to provide a space in open communication with and in continuation of the space 21. The inner upper margin of the wall 20 is designed to grip the upper end of the float member C and is provided with an inwardly projecting flange 23 adapted to seat on the upper face of the float body C. The side wall 20 is formed with apertures 24 adjacent the upper margin thereof to admit water into the space 20 for the purpose described with reference to the construction shown in Figs. 1 and 2.

The jacket as before stated is elastic and for this purpose is formed of rubber or rubber composition.

In the application and operation of the invention the jacket is applied to the float body by inserting the valve body through the opening at the upper end of the jacket afforded by the inner margin of the flange 17 or 23, which flange being elastic permits expansion of the rim thereof sufficiently to allow the valve or float body to be passed therethrough. On positioning the float body within the jacket the latter is adjusted so that the flange 17 or 23 will seat on the top of the float body and the requisite water space between the lower portion of the float and jacket will be afforded. It will be seen that the jacket may be readily removed and replaced thus providing an effective means for renewing the exterior wearing surface of the valve as occasion may require.

While I have shown the valve or float body of hemispherical and also of frusto-conical shape, it will be manifest that the valve body may have any suitable contour and the jacket shaped accordingly. It is also manifest that the valve body may be either resilient or rigid since the elastic jacket will function in either instance.

I claim:

1. In a float valve, a buoyant valve body, an elastic jacket encompassing the lower portion of said body in spaced relation thereto, said jacket having apertures leading from the space between the valve body and the jacket to the exterior of the latter, said jacket having gripped engagement with said valve body.

2. In a float valve of the character described, a buoyant valve body having inwardly converging side walls, and an elastic jacket extending over and covering the side and lower portion of said valve body in spaced relation thereto, said jacket being formed with apertures leading to the space between the jacket and valve body.

H. N. WAYNE.